United States Patent
Weinzierl et al.

(10) Patent No.: US 7,710,307 B2
(45) Date of Patent: May 4, 2010

(54) METHOD AND DEVICE FOR HIGH-RESOLUTION IMAGING OF TEST OBJECTS BY ELECTROMAGNETIC WAVES, IN PARTICULAR FOR MONITORING PEOPLE FOR SUSPICIOUS ITEMS

(75) Inventors: Jochen Weinzierl, Nuremberg (DE); Frank Gumbmann, Oberreichenbach (DE); Phat Hue Tran, Erlangen (DE); Lorenz-Peter Schmidt, Hessdorf (DE); Michael Jeck, Mainz (DE)

(73) Assignee: Smiths Heimann GmbH, Wiesbaden (DE)

( * ) Notice: Subject to any disclaimer, the term of this patent is extended or adjusted under 35 U.S.C. 154(b) by 9 days.

(21) Appl. No.: 12/192,096

(22) Filed: Aug. 14, 2008

(65) Prior Publication Data
US 2009/0051586 A1 Feb. 26, 2009

Related U.S. Application Data

(63) Continuation of application No. PCT/EP2006/011630, filed on Dec. 5, 2006.

(30) Foreign Application Priority Data
Feb. 14, 2006 (DE) .................. 10 2006 006 962

(51) Int. Cl.
*G01S 13/90* (2006.01)
(52) U.S. Cl. .................................. 342/25 A
(58) Field of Classification Search ........... 342/25 A
See application file for complete search history.

(56) References Cited

U.S. PATENT DOCUMENTS

| 5,859,609 A | 1/1999 | Sheen et al. |
| 6,137,437 A | 10/2000 | Lin et al. |
| 7,609,196 B2 * | 10/2009 | Jeck et al. .............. 342/25 A |
| 2003/0178034 A1 | 9/2003 | Yuki |
| 2008/0174476 A1 * | 7/2008 | Detlefsen et al. |
| 2009/0051586 A1 * | 2/2009 | Weinzierl et al. |

FOREIGN PATENT DOCUMENTS

| DE | 10 2005 042 463 A1 | 3/2007 |
| GB | 2 399 947 A | 9/2004 |
| WO | WO 2005/050160 A2 | 6/2005 |
| WO | WO 2007093208 A1 * | 8/2007 |

* cited by examiner

*Primary Examiner*—Dan Pihulic
(74) *Attorney, Agent, or Firm*—Muncy, Geissler, Olds & Lowe, PLLC

(57) ABSTRACT

In order to image test objects by electromagnetic waves, in particular millimetric waves, a test object is illuminated with the electromagnetic waves, the scattered waves are received, and are evaluated for a representation of the test object in the form of an image based on the principle of "synthetic aperture radar" (SAR). In order to allow as large an area as possible to be imaged with high resolution in a short time, the phase centres of the transmitting and receiving antennas are, according to the invention, moved on a circular path parallel to the respective digital focus planes of the imaging system, and are at the same time shifted linearly in a further direction parallel to the respective focus plane. The method can be used for monitoring people for suspicious objects, for example for monitoring airline passengers at an airport.

12 Claims, 5 Drawing Sheets

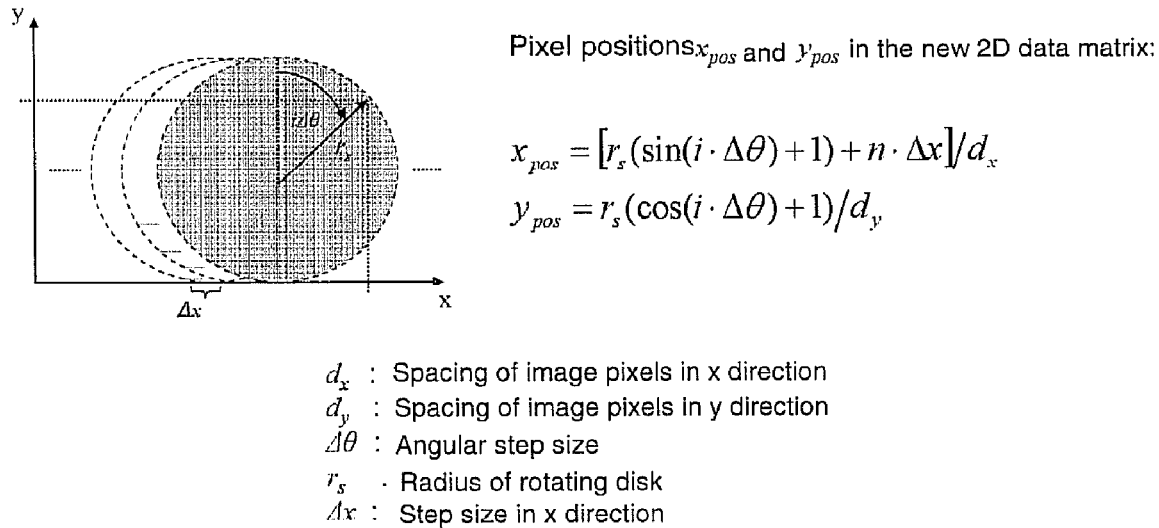

Pixel positions $x_{pos}$ and $y_{pos}$ in the new 2D data matrix:

$$x_{pos} = [r_s(\sin(i \cdot \Delta\theta)+1) + n \cdot \Delta x]/d_x$$
$$y_{pos} = r_s(\cos(i \cdot \Delta\theta)+1)/d_y$$

$d_x$ : Spacing of image pixels in x direction
$d_y$ : Spacing of image pixels in y direction
$\Delta\theta$ : Angular step size
$r_s$ : Radius of rotating disk
$\Delta x$ : Step size in x direction

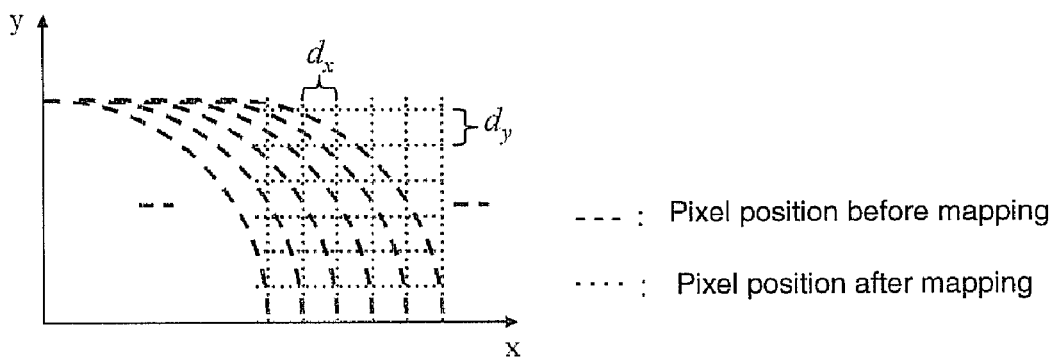

- - - : Pixel position before mapping

· · · · : Pixel position after mapping

Fig. 6

METHOD AND DEVICE FOR HIGH-RESOLUTION IMAGING OF TEST OBJECTS BY ELECTROMAGNETIC WAVES, IN PARTICULAR FOR MONITORING PEOPLE FOR SUSPICIOUS ITEMS

This nonprovisional application is a continuation of International Application No. PCT/EP2006/011630, which was filed on Dec. 5, 2006, and which claims priority to German Patent Application No. 10 2006 006 962.5, which was filed in Germany on Feb. 14, 2006, and which are both herein incorporated by reference.

BACKGROUND OF THE INVENTION

1. Field of the Invention

An aspect of the invention relates to a method for high-resolution imaging of test objects by electromagnetic waves, in particular for inspecting individuals for suspicious items, in which the test object is illuminated with electromagnetic waves, and the scattered waves are received and analyzed using the synthetic aperture radar principle (SAR) to display an image of the test object.

2. Description of the Background Art

In order to inspect individuals or pieces of luggage (hereinafter referred to as test objects) for hidden dangerous items (weapons, explosives), imaging systems are known in which the test objects (individuals, pieces of luggage) are scanned with millimeter waves in order to detect suspicious items (U.S. Pat. No. 5,859,609). The advantage of these imaging systems is that nonmetallic items as well as metallic items can be easily detected due to their material-specific dielectric properties. Similarly, the use of radar-based millimeter wave imaging systems in the field of nondestructive testing of materials (NDT) has increased sharply.

To ensure reliable detection of dangerous items when used in the security field, or of defects in nondestructive testing of materials, the imaging systems require high spatial resolution. Furthermore, it is desirable, especially in applications in the field of security, for the system to be capable of scanning the largest possible area in a short period of time.

High resolution in one plane (lateral resolution) can be achieved with focusing elements, for example elliptical mirrors or dielectric lenses, which sharply focus the measurement signal on the surface of the test object. However, this type of focusing has inadequate depth of focus. High resolution is only provided in one plane, the focal plane. A further disadvantage is that when implementing fast scanning systems using large dielectric lenses or mirrors to concentrate the measurement signals, rapid motion of the large masses can be accomplished mechanically only with difficulty.

German patent application 10 2005 042 463, which is incorporated herein by reference, describes a method of the generic type in which a test object is successively illuminated along its circumference with millimeter waves, and the scattered millimeter waves are received and analyzed using the synthetic aperture radar principle (SAR) to display an image of the test object. A synthetic aperture is created by the means that the waves emitted by an antenna are first spatially concentrated, wherein the location of high concentration is manipulated such that it serves as a moving virtual antenna for SAR analysis.

In this imaging system using the SAR principle, it is known to use no other focusing components for beam forming beyond one antenna (monostatic) or multiple adjacent antennas (quasimonostatic), for example horn antennas, for transmitting and receiving radar signals reflected from the test object. The actual focusing here is performed after the fact by digital signal processing using the SAR principle. This type of data processing permits digital focusing of the raw data for any desired distance of the antenna from the test object. Additional focusing elements such as mirrors or lenses can be omitted, thus drastically reducing the mass of the millimeter wave sensors to be moved.

If a high lateral resolution in two dimensions (vertical and horizontal) is to be achieved with the SAR processing, then the phase center of each transmitting and/or receiving antenna must also be moved in two dimensions. This is achieved in a known manner by a linear motion in the horizontal and vertical direction. The motion of two axes (a raster scan, for example) would be too slow for a fast imaging system.

SUMMARY OF THE INVENTION

It is therefore an object of the invention to provide a method for imaging test objects by means of electromagnetic waves that can image as large an area as possible in a short time with high resolution.

This object is achieved in accordance with at least an embodiment of the invention in that the phase centers of the transmitting and receiving antennas can be moved on a circular path parallel to the respective digital focal planes of the imaging system and are substantially simultaneously displaced linearly in another direction parallel to the respective focal plane. The linear displacement here can be in a vertical, horizontal, or inclined direction.

As a result of the rotation of the antenna aperture, which is to say the two-dimensional motion of the antenna phase center, SAR processing of the signals is possible in the vertical and horizontal directions.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 6 shows a representation of measured raw data in a Cartesian coordinate system for signal processing.

DETAILED DESCRIPTION

Figure 3:
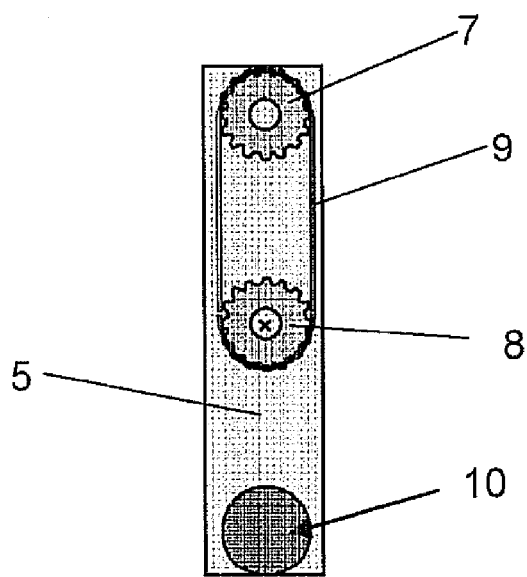
Figure 4:
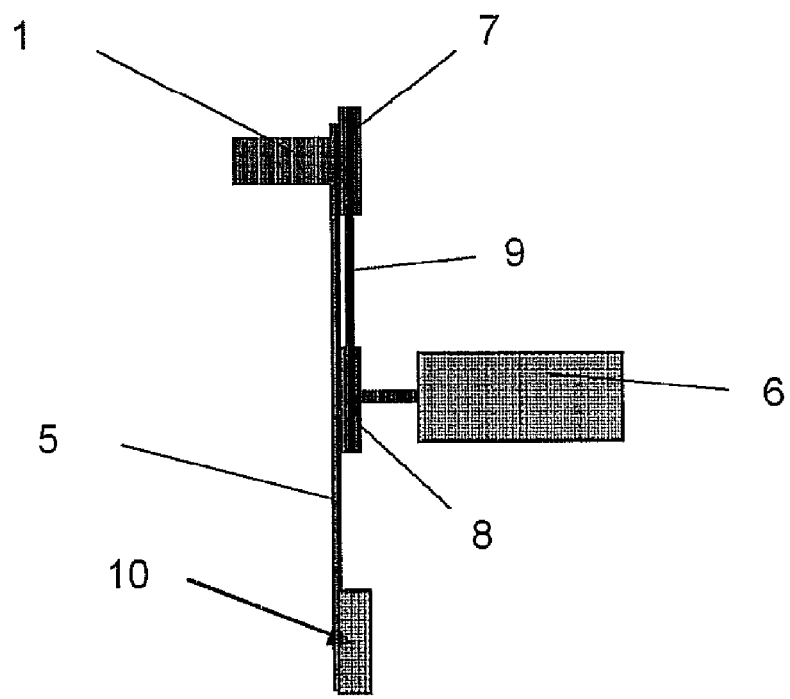
Figure 5:
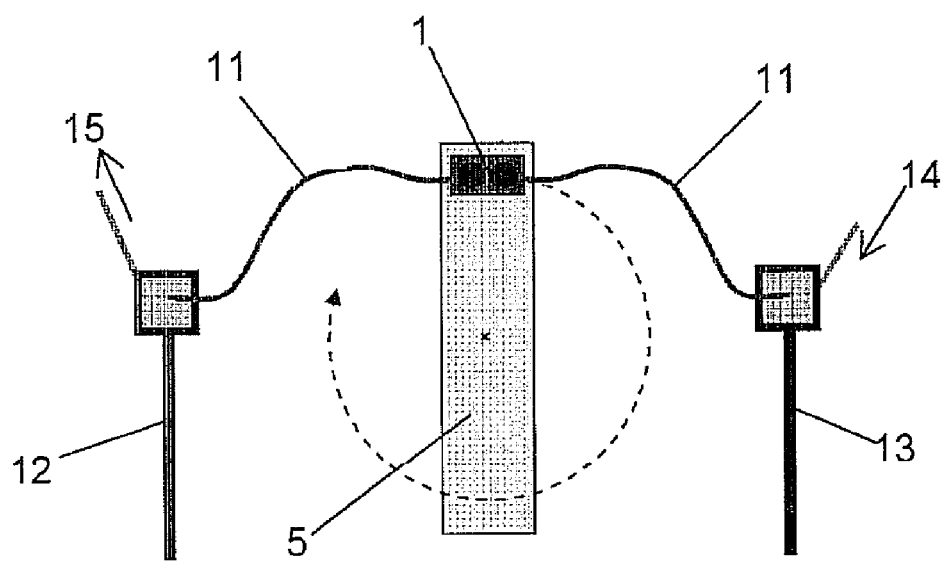

The imaging systems described below are each part of a test unit used to inspect airline passengers at an airport. The test unit is used to scan airline passengers for suspicious items such as weapons or explosive substances during check-in. The electromagnetic waves used for illuminating the test objects have a frequency between 1 GHz and 10 THz. Preferably, millimeter waves with a frequency between 30 GHz and 300 GHz are used. Either the transmitting antennas themselves, or—as shown in FIGS. 3 through 5—antenna pairs with separate receiving antennas, can be used to receive the reflected waves. Aperture radiators, in particular horn antennas, are preferably used as transmitting and/or receiving antennas.

The test unit can include a platform upon which the test object, for example an airline passenger, is located while the inspection is being carried out. In this process, the transmitting and receiving systems rotate about the stationary test object in order to successively illuminate it along its circumference with millimeter waves. In addition, the test unit includes an analysis system having suitable computing power, which uses the SAR principle to analyze the received waves scattered by the test object in order to obtain an image of the test object. The images produced are displayed to an operator on suitable display devices.

Figure 1:
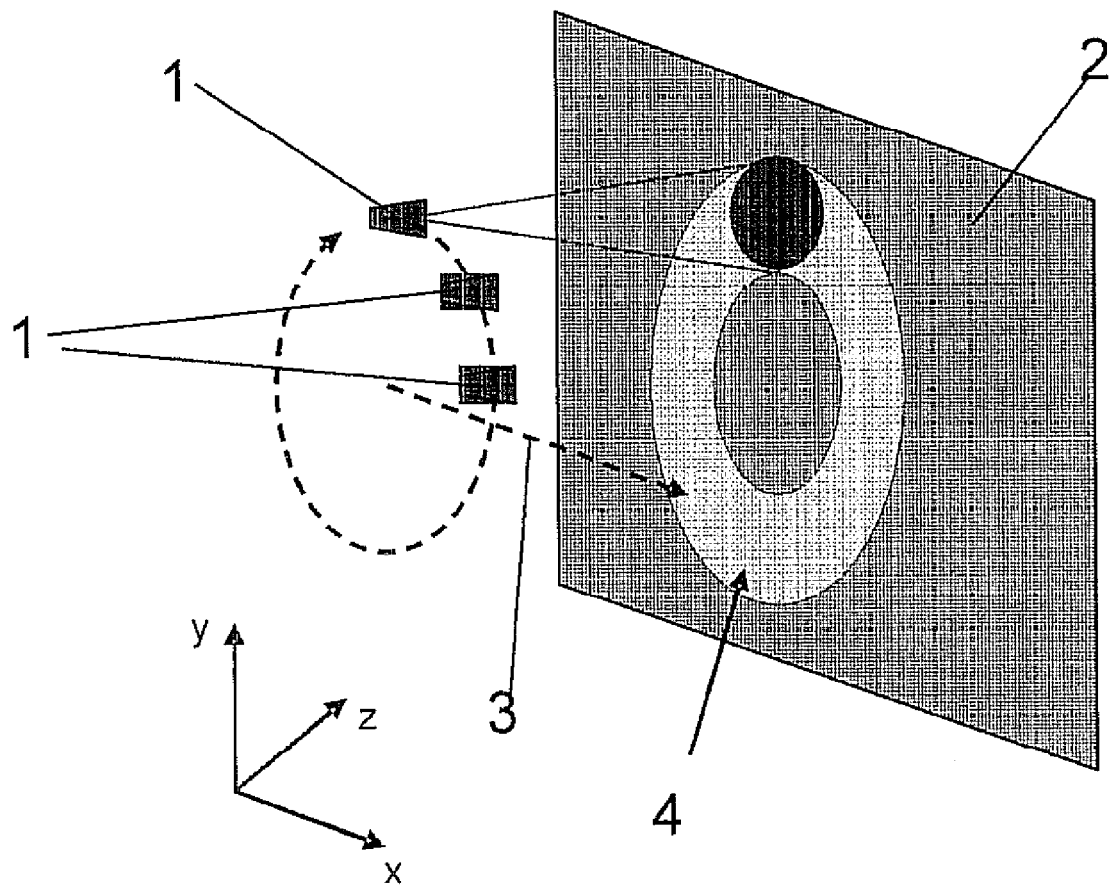
FIG. 1 shows a principle of the antenna motion.

FIG. 1 illustrates the principle of the antenna motion. Transmitting and receiving antennas (antenna pair 1) are movably supported in the test unit such that their phase centers are moved on a circular path parallel to the respective digital focal planes 2 of the imaging system and are simultaneously displaced linearly in another direction parallel to the respective focal plane 2. For purposes of simplification, the digital focal plane 2, which is to say the surface to be scanned on the test object, is chosen to be a plane parallel to the X-Y plane. The rotational motion of the transmitting and receiving antennas 1 thus likewise takes place parallel to the X-Y plane. The additional linear displacement of the transmitting and receiving antennas 1 takes place parallel to the respective focal plane 2, horizontally in the X direction (arrow 3) in the example. The linear displacement can also take place in a vertical or inclined direction. The test object is thus scanned in a circle 4 that is displaced linearly. Since the focal plane 2 is determined digitally, it can be chosen as a curved surface, for example a cylindrical surface, or as a surface having peaks and valleys.

Figure 2:
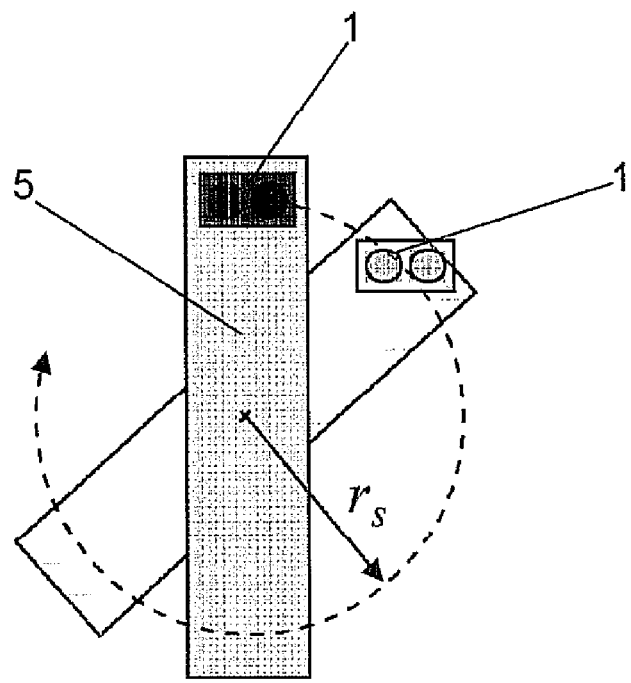
FIGS. 2-5 each show parts of a mechanical structure in various views.

The major parts of the mechanical structure of an inventive imaging system are shown in FIGS. 2 (front view), 3 (rear view), and 4 (side view).

It is necessary for SAR processing and for unambiguous interpretation of the measurement results for the transmitting and receiving antennas (antenna pair 1) to each receive the same polarization direction during the rotation. A rotating polarization is possible as well as a permanently fixed polarization direction. FIGS. 2 through 4 show a fastening of the antenna pair in which the polarization of the transmitted and received electromagnetic waves is preserved during rotation of the antenna pair 1, and twisting of the connecting lines is prevented.

To this end, the antenna pair 1 is rotatably supported in a sleeve with a ball bearing. The sleeve is rigidly connected to a rotary lever 5 that is supported in the device so as to be rotatable about its center point by means of a rotary drive 6. In addition, the antenna pair 1 is connected to the rotary drive 6 of the rotary lever 5 through a combination of two gears 7, 8 and a V-belt 9, wherein a transmission ratio of 1:1 is set, as shown in FIGS. 3 and 4. The connection between the mount of the antenna pair 1 to the drive 6 of the rotary lever 5 through the gear/V-belt transmission with a transmission ratio of 1:1 ensures that both antennas of the antenna pair 1 have the same orientation for every position on the circular path, as shown in FIG. 2. A counterweight 10 is fastened to the opposite end of the rotary lever 5 so that the antenna pair 1 moves uniformly along the circular path of radius r without imbalance.

The connection between the antennas and the transmitting and receiving unit requires waveguides that have great flexibility, even at high rotational speeds of the antennas. This would only be achievable with enormous technical expenditure using coaxial or hollow waveguide methods, especially for a frequency range above 50 GHz.

Consequently, as shown in FIG. 5, flexible lines in the form of dielectric waveguides 11 with appropriate transition adapters to hollow waveguide systems are used by preference. The dielectric waveguides 11 are held in matched holders 12, 13, and conduct the transmit signals 14 to the transmitting antenna, and conduct the receive signals 15 from the receiving antenna to the analysis system. Dielectric waveguides have the further advantage that they have low attenuation in the millimeter wave region as compared to hollow waveguide and coaxial line techniques.

The preferred signal processing is explained in detail below with the aid of FIGS. 6 through 8.

In conventional SAR processing, a spatially invariant correction filter is used. This means that the same correction term is used for reconstructing every pixel. This allows processing with conventional convolution or time-efficient FFT (fast Fourier transform) algorithms.

This spatially invariant correction filter can be used in the case of an imaging geometry with purely Cartesian, polar or spherical coordinates. In the case of the rotating antenna pair 1, which is additionally displaced linearly in a vertical or horizontal direction, as shown in FIG. 1, a combination of linear motion in Cartesian coordinates and in polar coordinates is present.

In contrast to conventional SAR applications, this combined motion requires a few additional processing steps. In an embodiment two different methods of signal processing may be possible according to the invention: an approximated SAR reconstruction in Cartesian coordinates with spatially invariant correction term; or an exact reconstruction in a mixed coordinate system (Cartesian and polar coordinate system) with spatially varying correction term.

Figure 7:
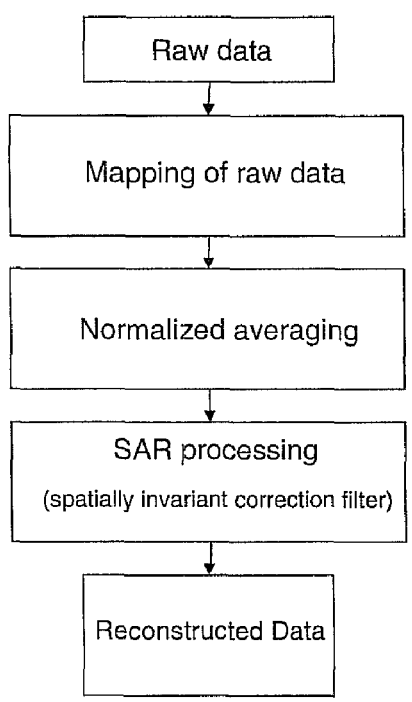
FIG. 7 shows a flow diagram of the SAR processing with a spatially invariant correction filter.

The flow diagram of the SAR reconstruction in Cartesian coordinates with spatially invariant correction filter (method 1) is shown in FIG. 7.

In order to carry out SAR processing with conventional algorithms from the literature, the measured raw data are first mapped onto a Cartesian coordinate system. This mapping of the raw data is shown in FIG. 6. In this process, the spacings of individual grid points dx, dy in the new coordinate system are chosen manually.

Due to the mapping of the rotational and linear motion into a Cartesian coordinate system, a new raw data matrix with a nonuniform pixel density results. In order to remedy this, interpolation based on the principle of normalized averaging is then carried out. This is followed by SAR processing with spatially invariant correction filter. This can be carried out by conventional SAR algorithms.

Figure 8:
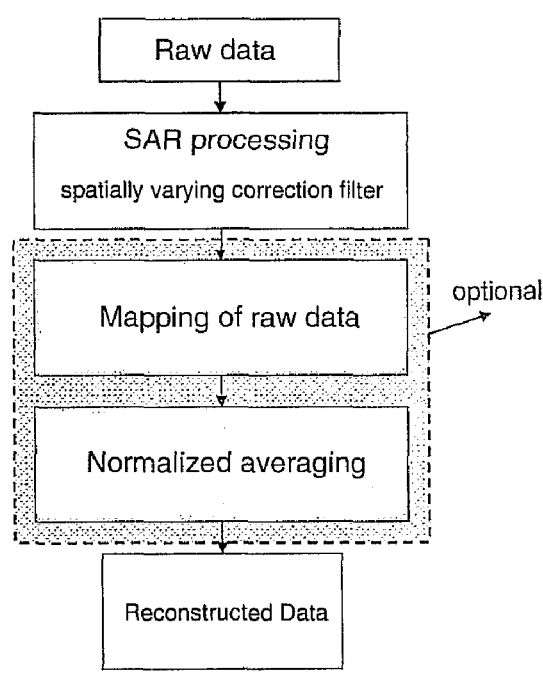
FIG. 8 shows a flow diagram of SAR processing with a spatially variable correction filter.

FIG. 8 shows a flow diagram of an exact reconstruction with spatially varying correction filter (method 2).

The exact but more time-consuming reconstruction of the raw data is carried out with a spatially varying correction filter in this method. In this process, a separate correction term is required for each pixel. The exact reconstruction of the test object $f(x, y, z=Z_0)$ for a distance $Z_0$ between the transmitting and receiving antennas 1 and the test object can be described mathematically as follows. Here, $s(x, y, \omega)$ designates the raw data for various angular frequencies $\omega$:

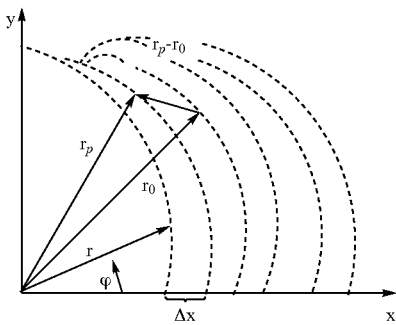

$r_0$: Distance from coordinate origin to the pixel or image point to be reconstructed $r_p$: Distance from coordinate origin to the surrounding pixels or image points $\phi$: Angular position on circular path of transmitting/receiving antennas $\Delta x$: Step size of linear motion in horizontal or vertical direction $$f(x_0,y_0,z_0,\omega)=\iint s(x,y,\omega)e^{j2k|\vec{r}_p(x,y,z=)-\vec{r}_0(x_0,y_0,z=0)|}dxdy$$

$$\vec{r}_p(x,y,z)=x\cdot\vec{e}_x+y\cdot\vec{e}_y+z\cdot\vec{e}_z=$$

$$\vec{r}_0(x_0,y_0,z_0)=x_0\cdot\vec{e}_x+y_0\cdot\vec{e}_y+z_0\cdot\vec{e}_z=$$

The integration is replaced by a summation in the real case, since only discrete measurement points are present.

The positions of the transmitting and receiving apertures in Cartesian coordinates can be determined as follows:

Coordinates of the image point to be reconstructed:

$$x_0=\tilde{x}_0+r\cos(\phi_0)$$

$$y_0=r\sin(\phi_0)$$

$$z_0=Z_0$$

r: Radius of circular path of the transmitting/receiving aperture $\phi_0$: Angular position on circular path of transmitting/receiving antennas $\tilde{x}_0$: Position in horizontal or vertical direction due to linear motion Coordinates of the image points:

$$x=\tilde{x}+r\cos(\phi)$$

$$y=r\sin(\phi)$$

$$z=0$$

$$\tilde{x}\in[\tilde{x}_0-x_{3dB}/2,\tilde{x}_0+x_{3dB}/2],$$

$$\phi\in[\phi_0+\phi_{3dB}/2,\phi_0-\phi_{3dB}/2]$$

r: Radius of circular path of the transmitting/receiving aperture $\phi$: Angular position on circular path of transmitting/receiving antennas $x_{3dB}$: Size of the antenna spot in the object plane with reference to the x axis $$x_{3dB}=2Z_0\cdot a\tan(\phi_{3dB}/2)$$

$\phi_{3dB}$: 3 db primary lobe width of the transmitting/receiving aperture

In summary, the phase term $\phi(x,x_0,y,y_0,z,z_0)$ of the spatially varying correction filter can be formulated as follows:

$$\varphi(x,x_0,y,y_0,z,z_0)=2k|\vec{r}_P(x,y,z)-\vec{r}_0(x_0,y_0,z_0)|=$$
$$=2k\sqrt{(x-x_0)^2+(y-y_0)^2+(z-z_0)^2}=$$
$$=2k\sqrt{(\tilde{x}-\tilde{x}_0+r[\cos(\varphi)-\cos(\varphi_0)])^2+(r[\sin(\varphi)-\sin(\varphi_0)])^2+Z_0^2}$$

Following a pixel-by-pixel reconstruction with the spatially varying correction filter, the data can again be mapped onto a Cartesian coordinate system, and the effect of the nonuniform pixel spacing can again be remedied by the normalized averaging interpolation method.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for high-resolution imaging of a test object by an imaging system using electromagnetic waves, in particular for inspecting individuals for suspicious items, the method comprising:
    illuminating the test object with electromagnetic waves from a transmitting antenna having a phase center moved on a substantially circular path parallel to a respective digital focal plane of the imaging system and substantially simultaneously displaced linearly in another direction parallel to the respective focal plane;
    receiving scattered waves from the illumination with a receiving antenna having a phase center moved on a substantially circular path parallel to a respective digital focal plane of the imaging system and substantially simultaneously displaced linearly in another direction parallel to the respective focal plane; and
    analyzing the scattered waves using a synthetic aperture radio (SAR) principle to display an image of the test object.

2. The method according to claim 1, wherein at least one of the transmitting and receiving antennas is an aperture radiator or horn antenna.

3. The method according to claim 1, wherein electromagnetic waves with a frequency between 1 GHz and 10 THz are used for illuminating the test object.

4. The method according to claim 1, wherein a spatially invariant correction filter is used in the SAR analyzing for reconstruction of raw data corresponding to the scattered waves.

5. The method according to claim 1, wherein raw data corresponding to the scattered waves is reconstructed using a spatially varying correction filter.

6. A device comprising:
    a transmitting and receiving antenna via which electromagnetic waves are radiated and received;
    an analysis system that uses a synthetic aperture radio (SAR) principle to analyze received electromagnetic waves in order to obtain an image of a test object; and
    an imaging system,
    wherein the transmitting and receiving antenna is configured to be moved on a substantially circular path parallel to respective digital focal planes of the imaging system and is substantially simultaneously displaced linearly in another direction parallel to the respective focal plane.

7. The device according to claim 6, wherein the transmitting and receiving antenna is rotatably supported on a rotary lever that is rotatable by a rotary drive, and wherein the transmitting and receiving antenna is connected to the rotary drive such that it has substantially the same orientation for every position on the circular path.

8. The device according to claim 6, wherein flexible lines in the form of dielectric waveguides are used to conduct the transmit and receive waves.

9. The device according to claim 6, wherein the electromagnetic waves are millimeter waves.

10. The device according to claim 6, wherein the device is an airport security screening device.

11. The method according to claim 3, wherein electromagnetic waves with a frequency between 30 GHz and 300 GHz are used for illuminating the test object.

12. The device according to claim 6, wherein the transmitting and receiving antenna comprises a transmitting antenna and a receiving antenna.

* * * * *

UNITED STATES PATENT AND TRADEMARK OFFICE
CERTIFICATE OF CORRECTION

PATENT NO.         : 7,710,307 B2                                        Page 1 of 1
APPLICATION NO.    : 12/192096
DATED              : May 4, 2010
INVENTOR(S)        : Weinzierl et al.

It is certified that error appears in the above-identified patent and that said Letters Patent is hereby corrected as shown below:

On the title page change from:

Item (75) Inventors: Jochen Weinzierl, Nuremberg (DE)

To:

(75) Inventors: Jochen Weinzierl, Nuernberg (DE)

Signed and Sealed this

Twenty-ninth Day of June, 2010

David J. Kappos
*Director of the United States Patent and Trademark Office*